Patented Jan. 3, 1928.

1,654,918

UNITED STATES PATENT OFFICE.

GUY H. BUCHANAN, OF WESTFIELD, GLENN B. WINNER, OF ELIZABETH, AND ERNEST L. TUCKER, OF ROSELLE, NEW JERSEY, ASSIGNORS TO AMERICAN CYANAMID COMPANY, OF NEW YORK, N. Y., A CORPORATION OF MAINE.

HYDROMETALLURGICAL PROCESS.

No Drawing.     Application filed November 16, 1923. Serial No. 675,209.

This invention relates to a hydro-metallurgical process of treating metalliferous ores, and has for its object to improve the procedures heretofore proposed.

With these and other objects in view, the invention consists in the novel steps and combinations of steps constituting the process, all as will be more fully hereinafter disclosed and particularly pointed out in the claims.

The process of this invention not only treats metalliferous ores to recover the values therein contained, but it also separates the reagents employed in such form that a substantial part thereof may be returned to the process and used again, thereby rendering available reagents which, on account of their cost, could not be used unless their recovery and return to the process were possible. It is applicable to ores containing precious metals, together with base metals, as for example an ore carrying gold, silver, and copper, and it may be applied with advantage to other materials.

As an example of the carrying out of the process, one may employ an ore carrying, say, gold, silver and copper, the copper being present in a form that is soluble in the reagent used; which in the present instance, is an alkali metal, or alkali earth metal cyanide. The ore is treated with the cyanide solution of about .1% strength in the ordinary way, the features of the procedure being well known. After the preliminary treatment, which leads to the solution of the metals present, the extracted or leached ore is separated in any suitable and well known manner from the solution which now carries the gold, silver and copper, in the form of double cyanides, and the extracted ore or tailings may be thrown away. To this said cyanide solution one now adds sufficient zinc to precipitate the bulk of the gold and silver in the form of a mud, which will be found to be somewhat contaminated with precipitated copper, and said precipitates separated out as by filtration.

After the removal of the precious metals by filtration, the solution is just neutralized with acid, whereupon the copper and any remaining silver and gold are precipitated as cyanides. One may employ for this purpose sulphuric, hydrochloric or sulphurous acids, or even carbon dioxide. The precipitated cyanide of copper thus obtained and containing perhaps some gold and silver, is filtered out and submitted to a special treatment to be described below.

Said copper cyanide is next collected in tanks and treated with sulphuric acid in the presence of sodium chloride and metallic iron, the latter being preferably in the form of scrap, or in the form of sponge. This treatment produces from the copper cyanide hydrocyanic acid and metallic copper. The hydrocyanic acid may be recovered in any suitable way, as by boiling the solution and absorbing the expelled acid in an alkaline solution. As the original leaching cyanide solution is alkaline, it is found desirable to use it in the absorption of the hydrocyanic acid, and in this way the original solution, or a portion of it is constantly regenerated. The metallic copper obtained as just described is removed by filtration, sedimentation, or other suitable and well known methods.

The step in this process which consists in the precipitation of the base metal cyanides by acidulation, and the treatment of these said cyanides with a strong acid in the presence of sodium chloride and iron for the precipitation of the base metals present followed by the regeneration of the cyanide solution constitutes an important feature of this invention.

In the example of copper cyanide cited, the sulphuric acid and iron only precipitates a small part of the copper present, and that with great difficulty or after a long period of treatment. This is probably due to the extreme insolubility of copper cyanide. On the other hand, copper cyanide is soluble to a considerable extent in sodium chloride, and therefore the combined presence of the sodium chloride, the sulphuric acid, and the iron in the solution, serves to very rapidly precipitate the metallic copper in a cement form, and at the same time regenerates the cyanide as hydrocyanic acid. With a relatively small bulk of solution, which need be handled in this process, it is a simple matter to boil off the hydrocyanic acid and to use as an absorbing medium for hydrocyanic acid the original cyanide leaching solution to which a little lime has been added.

What is claimed is:

1. The herein described hydrometallurgical process which comprises treating an insoluble metal cyanide with an acid and a metal capable of decomposing said cyanide into hydrocyanic acid and the metal originally combined with the cyanide; and recovering said last named metal.

2. The herein described hydrometallurgical process which comprises treating an insoluble metal cyanide with an acid, a salt which is a solvent for said cyanide and a metal, thereby decomposing said cyanide into hydrocyanic acid, and the metal previously combined with said cyanide; and recovering said last named metal.

3. The herein described hydrometallurgical process which comprises treating an insoluble metal cyanide in the presence of metallic iron and sodium chloride with an acid capable of liberating hydrochloric acid on treatment with a chloride, thereby decomposing the cyanide into hydrocyanic acid and the metal previously combined with the cyanides; and recovering said last named metal.

4. The herein described hydrometallurgical process which comprises treating copper cyanide with sulphuric acid, sodium chloride and metallic iron, thereby forming hydrocyanic acid and metallic copper.

5. The herein described hydrometallurgical process which comprises treating copper cyanide with sulphuric acid, sodium chloride and metallic iron; boiling the solution to expel the hydrocyanic acid; and recovering the precipitated copper.

6. The herein described hydrometallurgical process of treating ores containing copper and precious metals for the purpose of recovering said metals and regenerating the reagents employed, which comprises treating the ores with a weak cyanide solution to dissolve said metals; removing the leached residue; adding to the solution sufficient zinc to precipitate a portion of the precious metals present, but insufficient to precipitate the copper present; treating the solution from which the precipitated precious metals have been removed, with acid sufficient to neutralize said solution; filtering out the precipitated metallic cyanides; treating said last named cyanides with sulphuric acid in the presence of sodium chloride and iron sponge, distilling off the liberated hydrocyanic acid; collecting the latter; and filtering out and recovering the precipitated metal thus obtained.

7. The herein described hydrometallurgical process of treating an ore containing precious values and another metal soluble in hydrocyanic acid for the purpose of recovering the metals present and regenerating the reagents employed, which comprises treating said ore with a weak cyanide solution and removing the extracted solids; precipitating and removing the bulk of the precious values; precipitating the cyanide of said other metal; treating the filtered metal cyanide thus obtained with sulphuric acid, sodium chloride and metallic iron; separating out the hydrocyanic acid thus produced; absorbing the latter in an alkaline solution; and separating out the metal thus obtained.

8. The herein described hydrometallurgical process which comprises treating an insoluble metal cyanide with a substance which is a solvent therefor, and decomposing the same into hydrocyanic acid and the said metal by means of an acid and a metal capable of displacing said first mentioned metal from its combinations.

9. The herein described hydrometallurgical process which comprises treating copper cyanide with hydrochloric acid and iron, thereby forming hydrocyanic acid and metallic copper.

In testimony whereof we affix our signatures.

GUY H. BUCHANAN.
GLENN B. WINNER.
ERNEST L. TUCKER.